3,004,079
ALKYL HALIDES FROM ETHERS OR ALCOHOLS AND AN ALUMINIUM HALIDE ALKYLATION SLUDGE
Geoffrey John Sleddon, West Kilbride, and Robert Craig Anderson, Saltcoats, Scotland, assignors to Imperial Chemical Industries Limited, London, England, a corporation of Great Britain
No Drawing. Filed Dec. 7, 1959, Ser. No. 857,552
Claims priority, application Great Britain Dec. 12, 1958
7 Claims. (Cl. 260—652)

This invention relates to a process for the recovery of halogen from reaction residues and more particularly for the recovery of halogen from residues produced when one of the original reactants is an alkyl aluminium halide.

A number of reactions have been proposed in which alkyl aluminium halides are used for the alkylation of various materials. In one such process it has been proposed to prepare organosilanes by the reaction of an organoaluminium halide with a silica or silicate. In this case the alkyl aluminium halide may either be previously prepared or it may be formed in situ by the reaction of an alkyl halide on aluminium. In another process, organoboron compounds are produced by the reaction of organoaluminium halides on various boron-containing compounds, for example, such as boric oxide and metal borates. In all reactions of this type, the main by-product is a residue containing aluminium in combination with a halogen. This by-product is of little value for further processing. Furthermore, the economic attractiveness of processes of this nature would be increased if it were possible to recover at least a part of this residue in a commercially valuable form.

An object of the invention is to recover at least part of the halogen contained in the residue obtained in alkylation processes in which organoaluminium halides are used as the alkylating agent. Another object is to provide a process for the recovery thereof. Other objects will appear hereinafter.

According to the present invention, these objects are accomplished by a process comprising reacting at an elevated temperature a residue, as hereinafter defined, with a compound of the formula ROR′ where R is a methyl or ethyl group and R′ is a methyl or ethyl group or hydrogen and distilling off the resulting alkyl halide.

By the term "residue" as used herein, we mean the solid aluminium- and halogen-containing residue obtained from alkylating reactions in which an oxygen-containing material is alkylated by means of an organoaluminium halide, for example, of the formula $R_aAlX_{3-a}$ where R is a methyl or ethyl group, X is chlorine, bromine or iodine and $a$ is 1 or 2, either alone or in presence of an alkali metal or alkaline earth metal halide. Reactions in which such a residue is obtained include, for example, the production of silanes by reaction of an alkyl-aluminium halide with silica or a silicate, the production of boranes by reaction of an alkylaluminium halide and a boron compound such as boric oxide or a borate and the like.

The process of our invention may be carried out at widely varying temperatures, for example, from about 120° C. to about 400° C. It is, however, preferred to operate at temperatures within the range 200° C. to 300° C.

Suitable compounds for reacting with the residue in the process of our invention include, for example, methanol, ethanol, dimethyl ether, diethyl ether and methyl ethyl ether. It is, however, preferred to use methanol if it is desired to produce a methyl halide and diethyl ether if an ethyl halide is desired.

The reaction is normally carried out by passing the vapour of the compound of formula ROR′ through the residue in any suitable manner. Thus the residue may be in the form of a column and the vapour passed therethrough. Alternatively, the residue may be fed continuously into a bed in which it is converted to a fluidised form by the vapour of the compound ROR′ passing through. In this case, the process can be carried out in a continuous manner. In still another embodiment the reaction can be carried out under pressure in a pressurised reactor. In a further method the reactants may be heated together after mixing in a suitable vessel, for example, a heated kettle.

By the process of our invention, at least a major proportion of the halogen in the residue is recovered in a commercially attractive and usable form, that is, as an alkyl halide.

Our invention is further illustrated by the following examples in which all parts and percentages are by weight.

*Example 1*

303.5 parts of methyl aluminium sesquichloride and 203 parts of an acid treated bauxitic clay were reacted together at elevated temperature to produce volatile methylsilanes. There was also obtained a solid powdery residue which contained approximately 33 percent of chlorine. This residue was heated to 310° C. and 144 parts of methanol added thereto over a period of 6 hours while stirring. During this period, 145 parts of methyl chloride containing approximately 10 parts of hydrogen chloride distilled off and were collected.

*Example 2*

92 parts of methyl aluminium sesquichloride and 85 parts of an acid-treated bauxitic clay were reacted together at elevated temperatures to produce volatile methylsilanes. There was also obtained a powdery residue containing 25 percent of chlorine. This residue was heated to 280° C. in a stirred-bed reactor and 36 parts of methanol were passed through it at a rate of 12 parts per hour. During this period 37 parts of methyl chloride and 3.5 parts of hydrogen chloride distilled off and were collected.

*Example 3*

30 parts of a powdery residue containing 10 percent of chlorine was obtained by the reaction of an acid extracted bauxitic clay with methyl aluminium sesquichloride. This material was heated to 280° C. and 3 parts of dimethyl ether passed through the stirred residue. 1.0 part of methyl chloride and 1.1 parts of unreacted ether distilled off and were collected.

*Example 4*

327 parts of ethyl aluminium sesquibromide, 114.5 parts of anhydrous aluminium chloride and 30 parts of boric oxide were heated together to form boron triethyl. 28 parts of diethyl ether were added over a period of 1 hour to 50 parts of the residue obtained from the above process. The mixture was heated at 120° C. for 2 hours and the temperature raised over a further hour to 200° C. 25 parts of ethyl bromide and 6 parts of ethyl chloride distilled off and were collected.

*Example 5*

670 parts of ethyl aluminium sesquibromide and 200 parts of bentonite were reacted together at elevated temperature to give volatile ethylsilanes. There was obtained frim this process a residue containing 51.8 percent of bromine. 40 parts of this residue were heated to 215° C. in a stirred-bed reactor and 8 parts of methanol passed through mixed with nitrogen. 14.8 parts of a product distilling at 8° C. and which proved on analysis to be methyl bromide were obtained.

Example 6

40 parts of the residue used in Example 5 were treated in a similar manner using 9.2 parts of diethyl ether in place of methanol. A liquid containing 7.9 parts of ethyl bromide, 0.2 part of methyl bromide and 3.4 parts of unreacted ether distilled off and were collected.

Example 7

160 parts of an acid treated bauxitic clay and 90 parts of aluminium (containing 91% aluminium) were reacted at elevated temperatures by passing 310 parts of methyl chloride therethrough over a period of 10 hours to produce volatile methylsilanes. There was obtained from this process 430 parts of a residue containing 50 percent of chlorine. This residue was heated to 270° C. and 200 parts of methanol passed therethrough over a period of 5 hours while stirring. During the first three hours nitrogen was also passed through with the methanol at a rate of 6 parts per hour. 190 parts of a liquid distilled off and were collected. This liquid consisted of 164 parts of methyl chloride, 10 parts of methanol and 16 parts of hydrogen chloride.

What we claim is:

1. A process for the recovery of halogen which comprises reacting at a temperature of from 120° to 400° C., a residue containing aluminum in combination with a halogen and obtained from the alkylation with an alkyl aluminum halide of an oxygen containing material selected from the group consisting of a silica, a silicate, a borate and boric oxide, with a compound of the formula ROR′ where R is a radical selected from the group consisting of a methyl and ethyl group and R′ is a radical selected from the group consisting of a methyl group, ethyl group and hydrogen, and distilling off the resulting alkyl halide.

2. A process as claimed in claim 1 wherein the alkyl halide is selected from the group consisting of a chloride and bromide.

3. A process as claimed in claim 1 wherein the temperature is within the range of 200° C. to 300° C.

4. A process as claimed in claim 1 wherein the compound ROR′ is selected from the group consisting of methanol, ethanol, dimethylether, diethylether and methylethylether.

5. A process as claimed in claim 1 wherein the residue is in column form and the compound of formula ROR′ is passed therethrough in the form of a vapour.

6. A process according to claim 1 wherein the residue is fed into a fluidised bed and the compound ROR′ passed therethrough as the fluidising medium.

7. A process as claimed in claim 1 wherein said oxygen containing material is bauxitic clay.

References Cited in the file of this patent

UNITED STATES PATENTS 2,755,316　　Churchill et al. _____ July 17, 1956

OTHER REFERENCES

Thomas et al.: Anhydrous Aluminum Chloride in Organic Chemistry, Reinhold Publishing Corp. (1941), page 772.